(12) United States Patent
Aoki (10) Patent No.: US 7,907,328 B2
(45) Date of Patent: Mar. 15, 2011

(54) CIRCUIT BOARD, ELECTRO-OPTIC DEVICE, AND ELECTRONIC APPARATUS

(75) Inventor: Takashi Aoki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/495,928

(22) Filed: Jul. 1, 2009

(65) Prior Publication Data

US 2010/0033804 A1 Feb. 11, 2010

(30) Foreign Application Priority Data

Aug. 6, 2008 (JP) ................. 2008-203130

(51) Int. Cl.
*G02B 26/00* (2006.01)
(52) U.S. Cl. .................................. 359/296
(58) Field of Classification Search ............ 359/296, 359/237, 245, 248, 254; 345/107, 87, 105; 349/38, 46; 204/600, 450; 430/32, 34, 38
See application file for complete search history.

(56) References Cited

U.S. PATENT DOCUMENTS 7,736,936 B2 * 6/2010 Tanaka ..................... 438/69

FOREIGN PATENT DOCUMENTS

| JP | 2004-288881 A | 10/2004 |
| JP | 2007-103584 | 4/2007 |
| WO | WO-2007-043419 | 4/2007 |

* cited by examiner

*Primary Examiner* — Ricky L Mack
*Assistant Examiner* — Tuyen Q Tra
(74) *Attorney, Agent, or Firm* — AdvantEdge Law Group, LLC (57) ABSTRACT

A circuit board includes a substrate; a plurality of scan lines disposed on the substrate, the scan lines extending in a first direction; a plurality of signal lines disposed on the substrate, the signal lines extending in a second direction intersecting the first direction; a plurality of transistors, each of which is electrically connected to corresponding one of the plurality of scan lines and corresponding one of the plurality of signal lines; an insulating layer that covers the plurality of scan lines, the plurality of signal lines, and the plurality of transistors; and a plurality of electrodes, each of which is electrically connected to corresponding one of the plurality of transistors. One opening is formed in the insulating layer for every electrode group, the electrode group being constituted by at least two adjacent electrodes among the plurality of electrodes, and each of the plurality of electrodes is electrically connected to the corresponding one of the transistors through the opening.

9 Claims, 7 Drawing Sheets

CIRCUIT BOARD, ELECTRO-OPTIC DEVICE, AND ELECTRONIC APPARATUS

BACKGROUND

1. Technical Field

The present invention relates to a circuit board suited for use in electro-optic devices, such as electrophoretic devices and liquid crystal devices, and other devices, an electro-optic device including the circuit board, and an electronic apparatus including the circuit board or the electro-optic device.

2. Related Art

An electro-optic device, such as a liquid crystal device and an electrophoretic device used for display applications and the like, or a detecting device such as a fingerprint sensor includes a circuit board (active matrix substrate) that has a plurality of electrodes arranged in a two-dimensional pattern and a plurality of transistors corresponding to the respective electrodes. A typical procedure for manufacturing such a circuit board is as follows. First, a plurality of transistors are formed on a substrate, and then an insulating film (insulating layer) is formed on the transistors. Contact holes (through holes or via holes) are respectively formed at a plurality of positions of the insulating film. Then electrodes that connect to the transistors through these contact holes are formed. Subsequently, in the case of making an electrophoretic device, an electrophoretic sheet is disposed on the circuit board to make an electrophoretic device. The same procedure applies to other devices.

In the related circuit board described above, electrodes and contact holes are provided on a one-to-one correspondence (refer to Japanese Unexamined Patent Application Publication Nos. 2004-288881 and 2007-103584). Accordingly, in order to decrease the electrode-to-electrode distance among the plurality of electrodes, very small contact holes must be formed. Formation of small contact holes requires high alignment accuracy and thus the yield is low.

SUMMARY

An advantage of some aspects of the invention is that a circuit board having a structure than can help improve the yield is provided.

A first aspect of the invention provides a circuit board that includes (a) a substrate; (b) a plurality of scan lines disposed on the substrate, the scan lines extending in a first direction; (c) a plurality of signal lines disposed on the substrate, the signal lines extending in a second direction intersecting the first direction; (d) a plurality of transistors, each of which is electrically connected to corresponding one of the plurality of scan lines and corresponding one of the plurality of signal lines; (e) an insulating layer that covers the plurality of scan lines, the plurality of signal lines, and the plurality of transistors; and (f) a plurality of electrodes, each of which is electrically connected to corresponding one of the plurality of transistors. One opening is formed in the insulating layer for every electrode group, the electrode group being constituted by at least two adjacent electrodes among the plurality of electrodes, and each of the plurality of electrodes is electrically connected to the corresponding one of the transistors through the opening.

Since one opening is shared between at least two adjacent electrodes and the electrodes are connected to the corresponding transistors through this shared opening, the requirement of alignment accuracy during production can be made less severe compared to the cases where one opening is provided for every electrode. Thus, a circuit board having a structure that can help improve the yield can be provided.

For example, the electrode group may be constituted by two electrodes arranged in the first direction. In such a case, the plurality of signal lines are arranged so that two signal lines are assigned for every electrode group and sandwich the opening.

For example, the electrode group may be constituted by two electrodes arranged in the second direction. In such a case, the plurality of scan lines are arranged so that two scan lines are assigned for every electrode group and sandwich the opening.

In either cases, for example, the plurality of transistors are arranged so that two transistors are assigned for every electrode group and are arranged symmetrically to sandwich the opening.

The plurality of transistors are, for example, organic transistors.

The electrode group may be constituted by four electrodes arranged in two rows in the first direction and two columns in the second direction. In such a case, the plurality of scan lines are arranged so that two scan lines are assigned for every electrode group and sandwich the opening. The plurality of signal lines are arranged so that two signal lines are assigned for every electrode group and sandwich the opening.

With such a structure, the size of the opening can be further increased. Thus, the required alignment accuracy becomes lower and the decrease in yield can be more satisfactorily suppressed. Since production machines such as high-performance alignment machines are not needed, cost reduction can also be expected.

Another aspect of the invention provides an electro-optic device that includes the circuit board described above and an electro-optic layer disposed on the circuit board. "Electro-optic layer" is any layer having an optical property (transmittance, reflectance, luminance, etc.) that can be changed by physical stimuli such as application of voltage from outside. An electrophoretic layer containing an electrophoretic material and a liquid crystal layer containing a liquid crystal material are the examples of the electro-optic layer.

Yet another aspect of the invention provides an electronic apparatus that includes a display unit or the like constituted by the electro-optic device described above. "Electronic apparatus" include any display devices, television sets, electronic paper, clocks and watches, calculators, cellular phones, portable information terminals, etc.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described in detail with reference to the drawings. In the description below, an electrophoretic device is described as one example of an electro-optic device. One example of an electronic apparatus that includes the electrophoretic device in a display unit will also be described.

Figure 1:
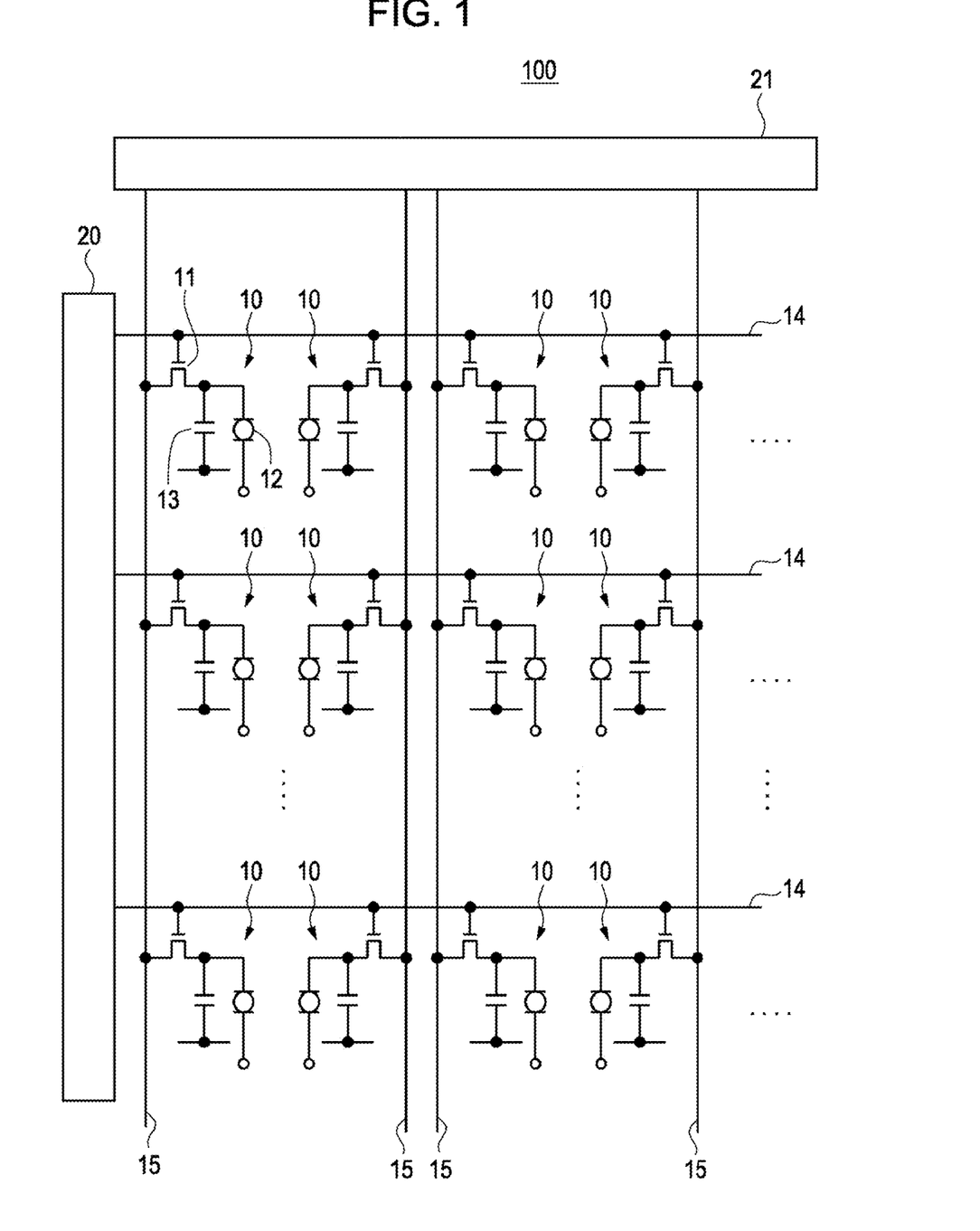
FIG. 1 is a diagram showing a circuit configuration of an electrophoretic device according to one embodiment.

FIG. 1 is a diagram showing a circuit configuration of an electrophoretic device according to one embodiment. An electrophoretic device (electrophoretic panel) 100 shown in FIG. 1 is formed on a substrate, such as a glass substrate or a plastic substrate, and includes a plurality of pixel units 10 arranged into a matrix. Each pixel unit 10 includes a transistor 11, an electrophoretic element 12, and a capacitor element 13. Such a configuration of the pixel unit 10 is only exemplary. Other configurations, such as one not including the capacitor element 13, may also be employed.

The transistors 11 are respectively disposed at intersections of a plurality of scan lines 14 and a plurality of signal lines (data lines) 15. Each transistor 11 has a gate connected to corresponding one of the scan lines 14 and a source connected to corresponding one of the signal lines 15. Each transistor 11 has a drain connected to one of the terminals of the electrophoretic element 12. The other terminal of the electrophoretic element 12 is, for example, given a particular reference potential. The capacitor element 13 has one terminal connected to the drain of the transistor 11. The other terminal of the capacitor element 13 is, for example, given the same reference potential as that of the other terminal of the electrophoretic element 12. The scan lines 14 are connected to a scan line driving circuit 20 and are supplied with control signals (scan signals) from the scan line driving circuit 20. The signal lines 15 are connected to a signal line driving circuit 21 and are supplied with control signals (data signals) from the signal line driving circuit 21.

Figure 2:
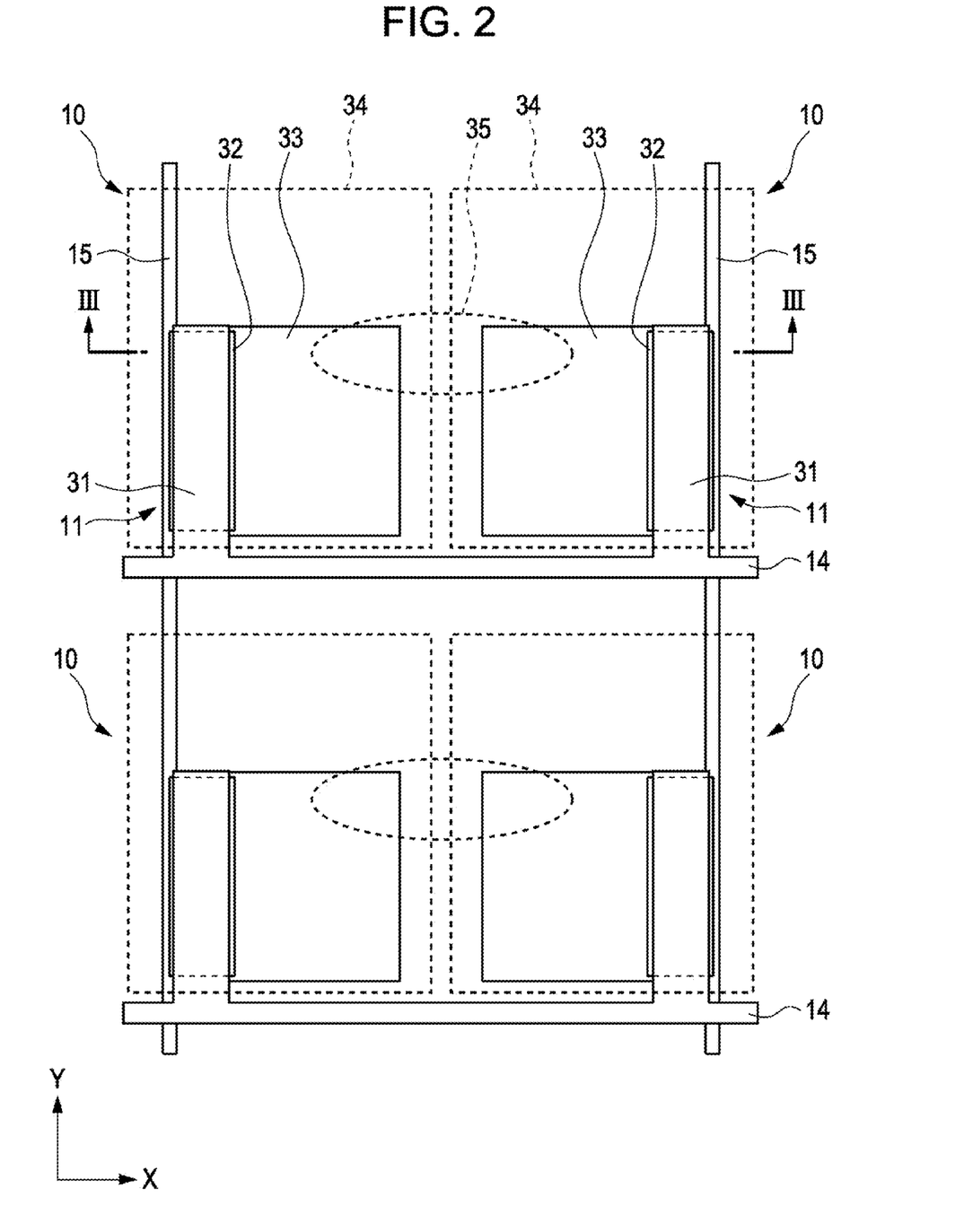
FIG. 2 is a schematic plan view showing part of the structure of the electrophoretic device.
Figure 3:
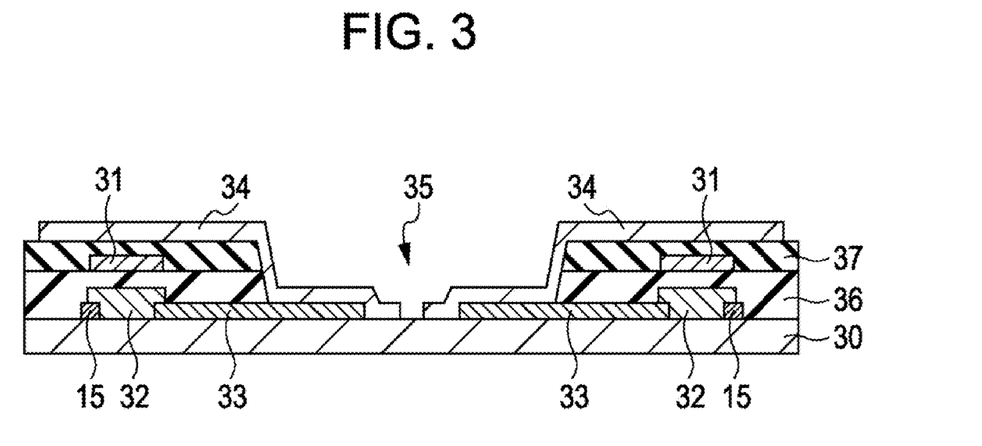
FIG. 3 is a schematic cross-sectional view taken along line III-III of FIG. 2.

FIG. 2 is a schematic plan view showing part of the structure of the electrophoretic device 100. In particular, FIG. 2 shows the structure of four adjacent pixel units 10. For the purpose of convenience, some of the features are indicated by dotted lines. FIG. 3 is a schematic cross-sectional view taken along line III-III of FIG. 2.

As shown in the drawings, the transistor 11 of each pixel unit 10 includes a gate (gate electrode) 31, a semiconductor film 32, and a drain electrode 33. In particular, the signal line 15 and the drain electrode 33 are disposed on the substrate 30, and the semiconductor film 32 is disposed between the signal line 15 and the drain electrode 33. This substrate 30 on which the transistor 11 and other components are formed corresponds to the circuit board.

As shown in FIG. 2, the scan lines 14 extend in the X direction (first direction) and the signal lines 15 extend in the Y direction (second direction) intersecting the X direction.

One end of the semiconductor film 32 is in contact with and electrically connected to one signal line 15. The position where the semiconductor film 32 contacts the signal line 15 corresponds to the source of the transistor 11. The other end of the semiconductor film 32 is in contact with and electrically connected to one drain electrode 33.

A gate insulating film 36 is formed on the substrate 30 by covering the signal line 15, the semiconductor film 32, and the drain electrode 33.

The gate electrode 31 is disposed on the gate insulating film 36 at a position that overlaps the semiconductor film 32 with the gate insulating film 36 between the gate electrode 31 and the semiconductor film 32. In this embodiment, one scan line 14 and the gate electrodes 31 arranged in the direction which this scan line 14 extends are integrally formed.

An interlayer insulation film 37 is formed on the gate insulating film 36 by covering the gate electrodes 31 and the scan line 14.

A pixel electrode (an individual electrode or, simply, an electrode) 34 is formed at a position on the interlayer insulation film 37 near the transistor 11. The pixel electrode 34 is in contact with and electrically connected to the drain electrode 33. In this embodiment, contact holes 35 are formed in parts of the interlayer insulation film 37 and the gate insulating film 36. A portion of the drain electrode 33 is exposed through the contact hole 35, and the drain electrode 33 comes into contact with the pixel electrode 34 at this exposed portion. Thus, the pixel electrode 34 is electrically connected to the transistor 11 through the contact hole 35 (opening). It should be noted that although the contact hole 35 illustrated in the drawings is elliptical in shape, the shape of the contact hole 35 is not limited to this and may be circular, oblong, and the like.

Figure 4:
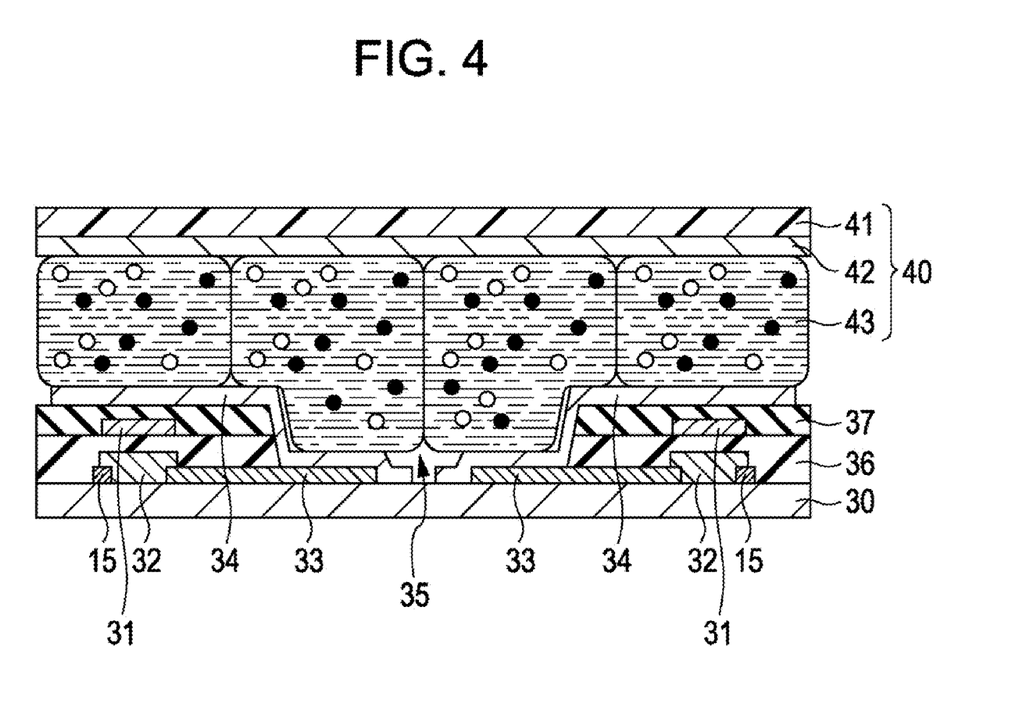
FIG. 4 is a schematic cross-sectional view showing how an electrophoretic sheet is placed on a substrate.

FIG. 4 is a schematic cross-sectional view showing how an electrophoretic sheet is placed on the substrate (circuit board). As shown in FIG. 4, the electrophoretic device 100 is configured by providing an electrophoretic sheet 40 on the substrate 30 provided with the transistors 11 and other associated components. The electrophoretic sheet 40 includes a substrate 41 formed of a plastic sheet or the like, a common electrode 42 disposed on the substrate 41, and an electrophoretic layer 43 disposed on the common electrode 42. The pixel electrodes 34 and the common electrode 42 are arranged to face each other with the electrophoretic layer 43 therebetween to construct an electrophoretic element. The electrophoretic layer 43 contains a plurality of microcapsules, for example, as shown in FIG. 4. Each microcapsule contains at least one type of fine particles. It should be noted that the structure of the electrophoretic layer 43 is not limited to the microcapsule type and may be any other suitable type.

As shown in FIG. 2, in this embodiment, two adjacent pixel electrodes 34 in the X direction (first direction) of the drawing are grouped, and one contact hole 35 is formed for every group of pixel electrodes 34. The grouped pixel electrodes 34 respectively contact (or make electrical connection with) the drain electrodes 33 of the transistors 11 through this contact hole 35. For example, in FIG. 2, the pixel electrode 34 on the upper left and the pixel electrode 34 on the upper right constitute a group of pixel electrodes 34 and share one contact hole 35. In other words, one contact hole 35 overlaps both of the grouped adjacent pixel electrodes 34. Two signal lines 15 are assigned for every group of pixel electrodes 34. As shown in FIG. 2, the two signal lines 15 are arranged to sandwich the one contact hole 35 in a plan view. More preferably, the two signal lines 15 are arranged in a symmetrical manner to sandwich the one contact hole 35 in a plan view. Note that the structure shown in FIG. 2 is repeated in the X direction. Thus, two signal lines 15 lie between two adjacent (closest) contact holes 35 in the X direction.

According to this structure, in comparison with the related art in which one contact hole is provided for every pixel electrode, the requirement of making contact holes finer is not stringent and contact holes can be made larger. That is, in the related art, one contact hole is needed in every pixel region defined by scan and signal lines, and thus the size of the contact holes must be smaller than that required in this embodiment. As for the specific figures, for example, suppose a pixel array has a density of 180 dpi. Since the pixel units are arranged in 141 μm pitches, the size of the contact holes in the respective pixel units must be reduced to about 40 μm or less. In order to form such contact holes, a high alignment accuracy is required. In contrast, in this embodiment, one contact hole 35 is formed over two pixel electrodes 34. Thus, when the same 180 dpi pixel array is used, the diameter of the contact holes 35 can be increased to about 180 μm.

Figure 5:
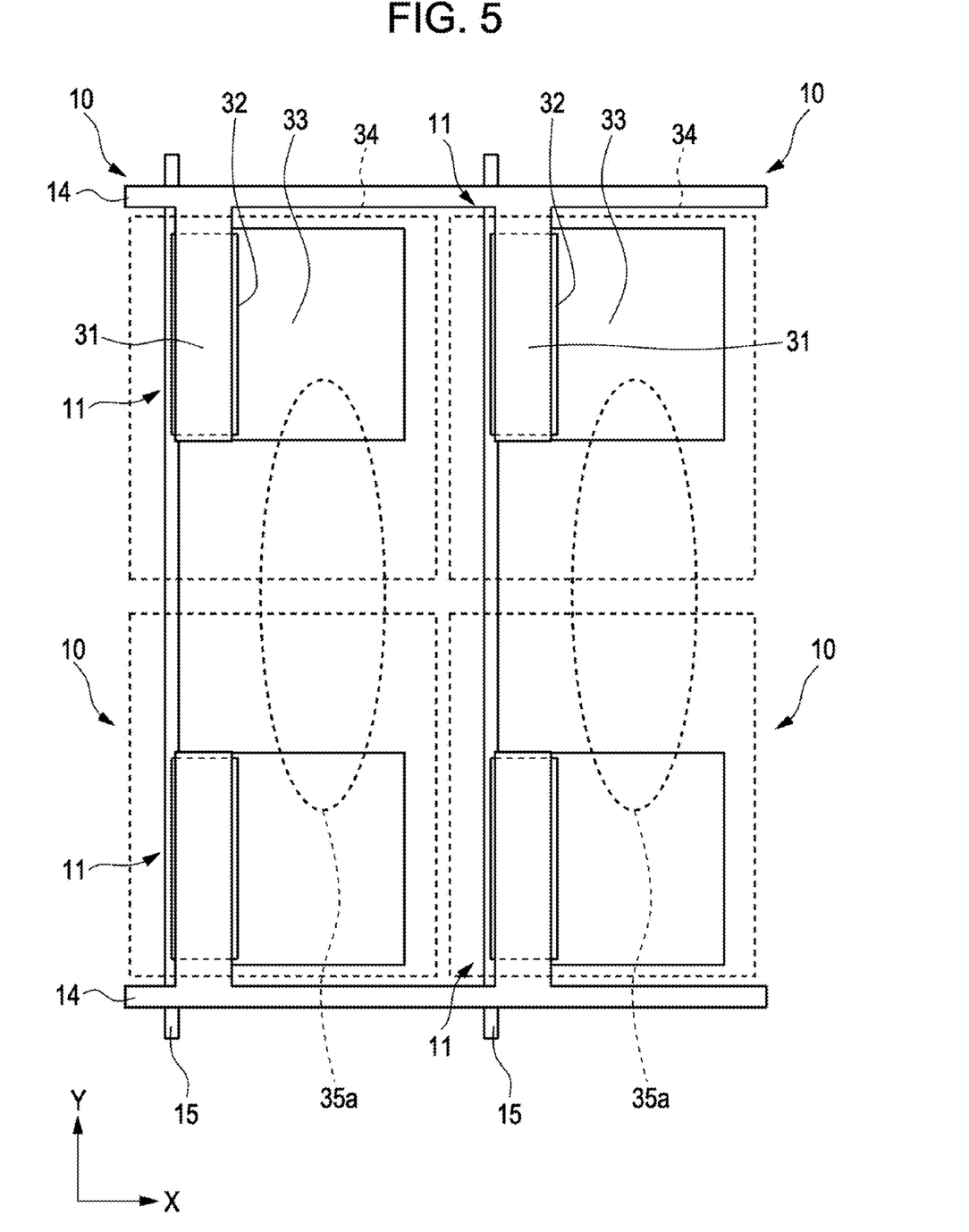
FIG. 5 is a schematic plan view showing part of an example structure of the electrophoretic device.

Alternatively, one contact hole may be shared between two adjacent pixel electrodes 34 in the Y direction (second direction) of the drawing. One example of such a layout is shown in FIG. 5. In FIG. 5, the components common to those of the electrophoretic device shown in FIG. 2 are represented by the same reference symbols and the detailed description therefor is omitted to avoid redundancy. In this example layout, two pixel electrodes 34 adjacent in the Y direction (second direction) in FIG. 5 are grouped. In particular, one contact hole 35a is formed for every group of pixel electrodes 34 adjacent in the Y direction. In other words, one contact hole 35a overlaps both of the grouped pixel electrodes 34 adjacent in the Y direction. The grouped pixel electrodes 34 respectively contact (or make electrical connection with) the drain electrodes 33 of the transistors 11 through this contact hole 35a. Moreover, in such a case, two scan lines 14 are assigned for every group of pixel electrodes 34 in the Y direction. As shown in FIG. 5, the two scan lines 14 are arranged to sandwich the one contact hole 35a in a plan view. More preferably, the two scan lines 14 are arranged in a symmetrical manner to sandwich the one contact hole 35a in a plan view. Note that the structure shown in FIG. 5 is repeated in the Y direction. Thus, two scan lines 14 lie between two adjacent (closest) contact holes 35a in the Y direction.

Figure 6:
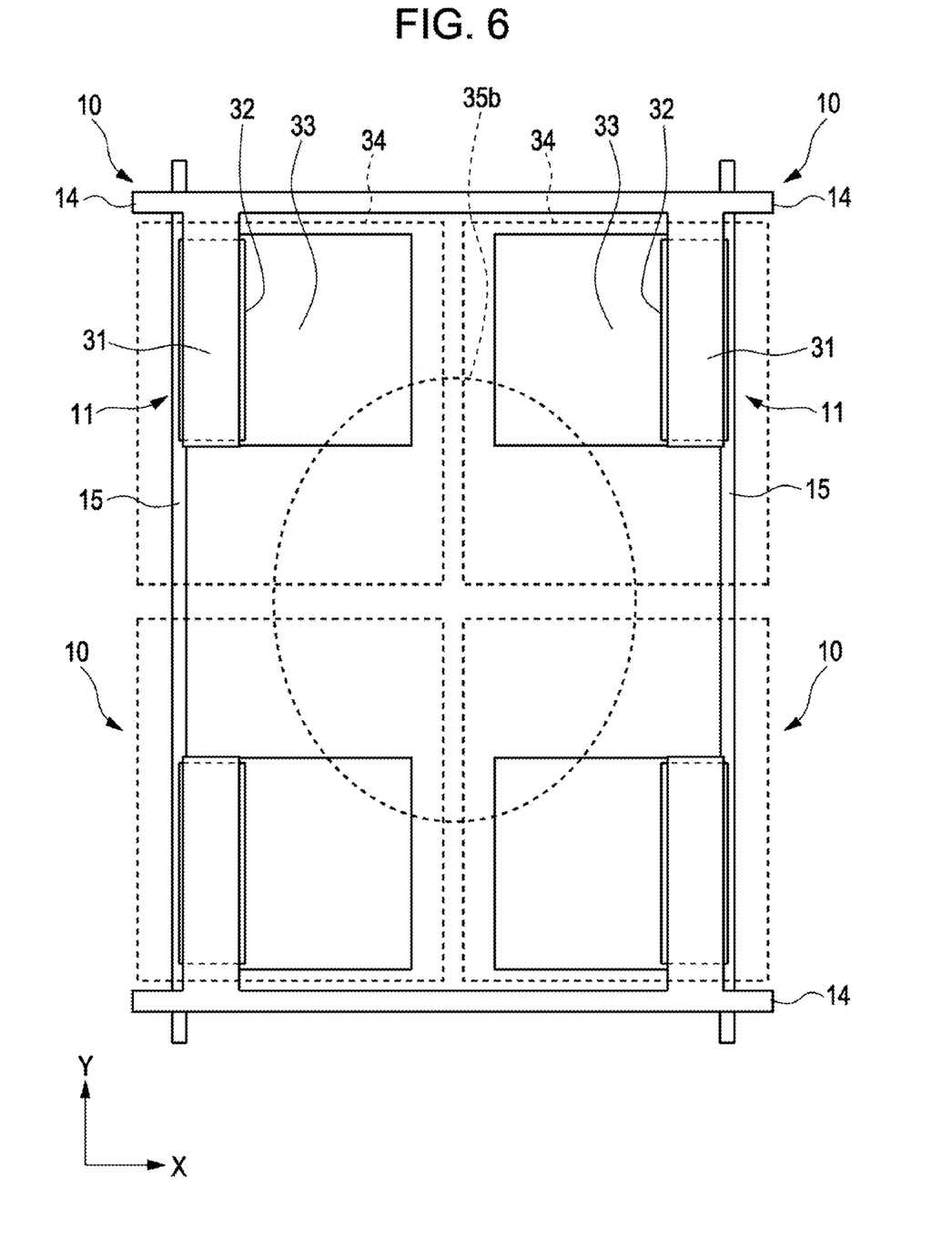
FIG. 6 is a schematic plan view showing an example structure in which one contact hole is shared among four pixel electrodes.

Alternatively, the layout may be designed so that one contact hole is shared between a larger number of pixel electrodes. FIG. 6 is a schematic plan view showing an example structure in which one contact hole is shared among four pixel electrodes. In the example shown in FIG. 6, one contact hole 35b is shared among four pixel electrodes 34 arranged in two by two. Other structures are the same as those of the electrophoretic device shown in FIG. 2, etc. In FIG. 6, the components common to those of the electrophoretic device shown in FIG. 2 are represented by the same reference symbols and the detailed description therefor is omitted to avoid redundancy.

The electrophoresis device of this embodiment has the above-described features. One preferable example of a method for making the electrophoretic device of this embodiment will now be described. FIGS. 7A to 7G are schematic cross-sectional view illustrating a method for making a circuit board and an electrophoretic device.

Figure 7A:
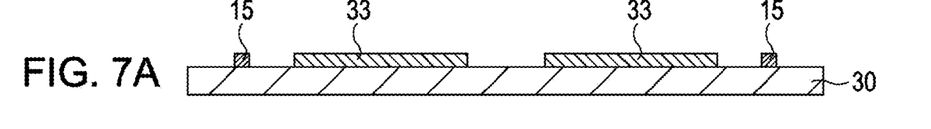
FIGS. 7A to 7G are schematic cross-sectional views illustrating a method for making a circuit board and an electrophoretic device.

Referring to FIG. 7A, signal lines 15 and drain electrodes 33 are first formed on one surface of a substrate 30. For example, a conductive film is formed on the surface of the substrate 30. The conductive film can be formed by a physical vapor deposition technique such as sputtering or vapor deposition. Then the conductive film is photo-etched to form the signal lines 15 and the drain electrodes 33. Alternatively, the signal lines 15 and the drain electrodes 33 may be formed by vapor-depositing a conductive film on the substrate 30 through a metal through mask having holes arranged in a particular pattern. In this manner, etching is not needed. Alternatively, the signal lines 15 and the drain electrodes 33 may be made dropping a polymer mixture containing metal fine particles and conductive particles such as graphite on the substrate 30 by an ink jet technique or the like. When such a technique is used, the signal lines 15 and other components can be formed easily at lower cost. The signal lines 15 and the drain electrode 33 may be composed of different materials.

The substrate 30 may be a glass substrate, a plastic substrate, or the like. The plastic substrate may be composed of a thermoplastic resin or thermosetting resin. Examples of the material used in the plastic substrate include polyolefins such as polyethylene, polypropylene, ethylene-propylene copolymers, and ethylene-vinyl acetate copolymers (EVA), cyclic polyolefins, modified polyolefins, polyvinyl chloride, polyvinylidene chloride, polystyrene, polyamide, polyimide, polyamideimide, polycarbonate, poly(4-methylpentene-1), ionomers, acrylic resins, polymethyl methacrylate, acryl-styrene copolymers (AS resins), butadiene-styrene copolymers, ethylene-vinyl alcohol copolymers (EVOH), polyesters such as polyethylene terephthalate, polybutylene terephthalate, polyethylene naphthalate, and polycyclohexane terephthalate (PCT), polyethers, polyether ketone, polyether ether ketone, polyether imide, polyacetal, polyphenylene oxide, modified polyphenylene oxide, polyarylate, aromatic polyethers (liquid crystal polymers), polytetrafluoroethylene, polyvinylidene fluoride, other fluororesins, various thermoplastic elastomers such as styrene, polyolefin, polyvinyl chloride, polyurethane, fluororubber, and chlorinated polyethylene thermoplastic elastomers, epoxy resins, phenolic resins, urea resins, melamine resins, unsaturated polyesters, silicone resins, polyurethanes, and copolymers, blends, and polymer alloys mainly composed of the foregoing. The substrate 30 may be a single layer composed of one of these materials or a laminate composed of two or more of these materials. An insulating layer (not shown) may be provided on the surface of the substrate 30. The insulating layer may be any known thin film having insulating property. Examples of such a film include films composed of organic materials, e.g., polymeric films such as polymethyl methacrylate, polyvinyl phenol, polyimide, polystyrene, polyvinyl alcohol, and polyvinyl acetate films, and parylene films; and films composed of inorganic materials such as silicon oxide, silicon nitride, metal oxides such as aluminum oxide and tantalum oxide, and metal compound oxides such as barium strontium titanate and lead zirconium titanate. These materials may be used alone or in combination.

Examples of the conductive material for the conductive film used to form the signal lines 15 and the drain electrodes 33 include Cr, Al, Ta, Mo, Nb, Cu, Ag, Au, Pt, Pd, In, Ni, and Nd and alloys of these metals; conductive oxides such as $InO_2$, $SnO_2$, and ITO; conductive polymers such as polyaniline, polypyrrole, polythiophene, and polyacetylene, to which dopants, e.g., acids such as hydrochloric acid, sulfuric acid, and sulfonic acid, Lewis acids such as $PF_6$, $AsF_5$, and $FeCl_3$, halogen atoms such as iodine, and metal atoms such as sodium and potassium may be added; and conductive compound materials in which carbon black and metal particles are dispersed.

Figure 7B:
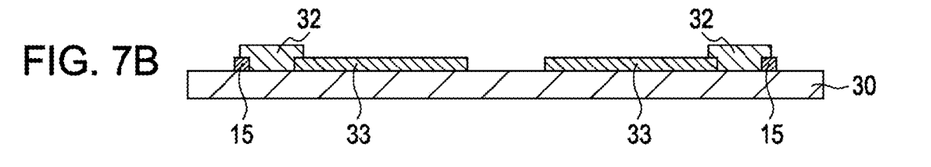

Next, as shown in FIG. 7B, semiconductor films 32 are formed on the substrate 30 over the signal lines 15 and the drain electrodes 33. In this embodiment, an organic semiconductor film is used as the semiconductor film 32. Any other known semiconductor films such as amorphous silicon films and polysilicon films may be used as the semiconductor films 32.

Examples of the organic semiconductor films that can be used as the semiconductor film 32 include those composed of polymer organic semiconductor materials such as poly(3-alkylthiophene), poly(3-hexylthiophene) (P3HT), poly(3-octylthiophene), poly(2,5-thienylenevinylene) (PTV), poly(para-phenylenevinylene) (PPV), poly(9,9-dioctylfluorene)

(PFO), poly(9,9-dioctylfluorene-co-bis-N,N'-(4-methoxyphenyl)-bis-N,N'-phenyl-1,4-phenylenediamine)(PFMO), poly(9,9-dioctylfluorene-co-benzothiadiazole) (BT), fluorene-triallylamine copolymers, triallylamine polymers, and fluorene-bithiophene copolymers such as poly(9,9-dioctylfluorene-co-dithiophene) (F8T2); and low-molecular-weight organic semiconductor materials such as $C_{60}$, metal phthalocyanines and their derivatives, acene molecule materials such as anthracene, tetracene, pentacene, and hexacene, and α-oligothiophenes such as quarter thiophene (4T), sexithiophene (6T), and octathiophene. These materials may be used alone or in combination. Examples of the method for forming such an organic semiconductor film include, but are not limited to, a vacuum vapor deposition technique, a spin coating technique, a casting technique, a pulling technique, a Langmuir-Blodgett technique, a spraying technique, an ink jet technique, and a silk screen technique.

In forming the organic semiconductor films as the semiconductor films 32 described above, the surface of the substrate may be preliminarily treated to smoothly carry out film formation. Examples of the substrate surface treatment include surface treatment using surface modifiers such as hexamethyldisilazane, cyclohexene, and octadecyltrichlorosilane; organic washing treatment using acetone, isopropyl alcohol, or the like; treatment using acids such as hydrochloric acid, sulfuric acid, and acetic acid or alkalis such as sodium hydroxide, potassium hydroxide, calcium hydroxide, and ammonia; UV ozone treatment; fluorination treatment; plasma treatment using oxygen, argon, or the like; and Langmuir-Blodgett film-forming treatment. One or more types of such treatment may be conducted. As a result of this treatment, the homogeneity of the semiconductor film 32 can be increased and the element characteristics can be further improved.

Figure 7C:
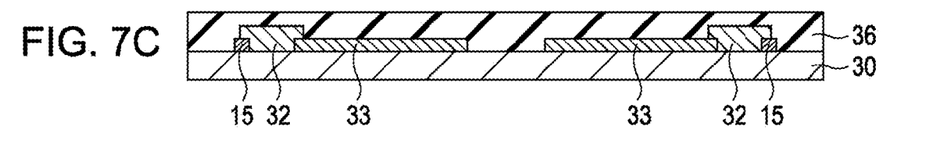

A gate insulating film 36 that covers the signal lines 15, the drain electrodes 33, and the semiconductor films 32 is formed on the substrate 30 as shown in FIG. 7C. The material for the gate insulating film 36 is not particularly limited as long as the material has an insulating property. Both organic and inorganic materials can be used. Examples of the known organic materials for gate insulating films include polymer films such as polymethyl methacrylate, polyvinyl phenol, polyimide, polystyrene, polyvinyl alcohol, and polyvinyl acetate films and parylene films. Examples of the inorganic materials include silicon oxide, silicon nitride, metal oxides such as aluminum oxide and tantalum oxide, and metal compound oxides such as barium strontium titanate and lead zirconium titanate. These materials may be used alone or in combination.

Figure 7D:
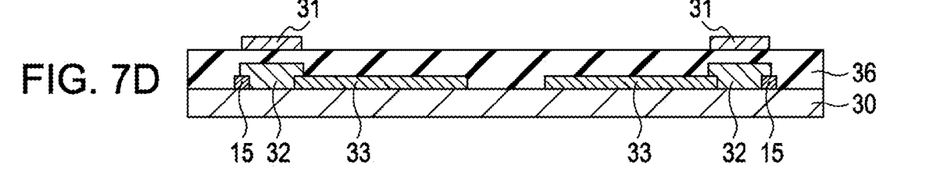

Gate electrodes 31 are formed at particular positions on the gate insulating film 36 overlapping the semiconductor films 32, as shown in FIG. 7D. Examples of the conductive material for the gate electrodes 31 include Cr, Al, Ta, Mo, Nb, Cu, Ag, Au, Pt, Pd, In, Ni, and Nd and alloys of these metals; conductive oxides such as $InO_2$, $SnO_2$, and ITO; conductive polymers such as polyaniline, polypyrrole, polythiophene, and polyacetylene, to which dopants, e.g., acids such as hydrochloric acid, sulfuric acid, and sulfonic acid, Lewis acids such as $PF_6$, $AsF_5$, and $FeCl_3$, halogen atoms such as iodine, and metal atoms such as sodium and potassium may be added; and conductive compound materials in which carbon black and metal particles are dispersed. The technique for forming the gate electrodes 31 is the same as that for forming the signal lines 15. For example, any of a method combining a physical vapor deposition technique and photo etching, a vapor deposition treatment through a metal through mask, and a method for dropping a conductive particle-containing polymer mixture can be employed appropriately.

Figure 7E:
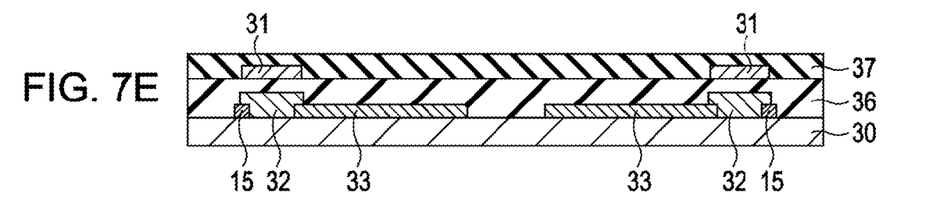

An interlayer insulation film 37 covering the gate electrodes 31 is formed on the gate insulating film 36, as shown in FIG. 7E. The material for the interlayer insulation film 37 is not particularly limited as long as the material has an insulating property. Both organic and inorganic materials can be used. Examples of the known organic materials for insulating films include polymer films composed of polyester, polycarbonate, polyvinyl alcohol, polyacetal, polyarylate, polyamide, polyamideimide, polyolefin, polyetherimide, polyphenylene ether, polyphenylene sulfide, polyethersulfone, polyetherketone, polyphthalamide, polyether nitrile, polybenzimidazol, polycarbodiimide, polysiloxane, polymethyl methacrylate, polymethacrylamide, nitrile rubber, acryl rubber, polyethylene tetrafluoride, epoxy resin, urethane resin, phenol resin, melamine resin, urea resin, polybutene, polypentene, polybutadiene, butyl rubber, and polystyrene and their copolymers; and parylene films. Examples of the inorganic material include silicon oxide, silicon nitride, metal oxides such as aluminum oxide, tantalum oxide, and the like, metal compound oxides such as barium strontium titanate and lead zirconium titanate, and silicon-based insulating films obtained from films composed of benzocyclobutene, polysilazane compounds, polysilane compounds, etc., formed by application. These materials may be used alone or in combination.

In forming the interlayer insulation film 37, instead of forming the interlayer insulation film 37 on the entire surface of the substrate 30, it is possible to use a material that allows exposed portions to be directly formed at the positions of the pixel units using a photosensitive material such as photosensitive polysilazane or a photo-setting resin. In such a case, the step of forming contact holes described below may be omitted.

Figure 7F:
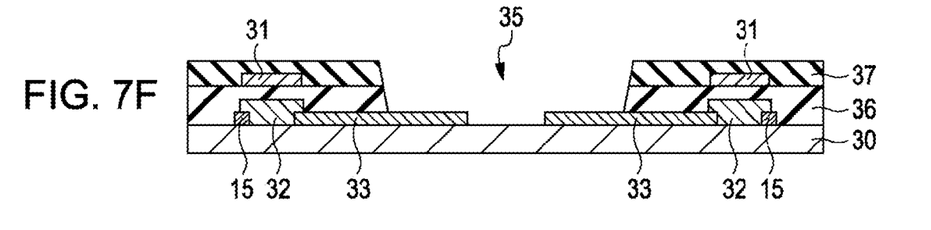

Next, as shown in FIG. 7F, particular portions of the gate insulating film 36 and the interlayer insulation film 37 are removed to form contact holes 35. For example, an etching mask (not shown) having openings that at least partly overlap the drain electrodes 33 is formed on the insulating layer constituted by the gate insulating film 36 and the interlayer insulation film 37 and etching is conducted through this etching mask. The etching technique may be of any type and method as long as the drain electrodes 33 previously formed are not affected. Examples of the etching technique include wet etching using acids such as hydrofluoric acid, nitric acid, hydrochloric acid, and sulfuric acid, wet etching using bases such as sodium hydroxide, potassium hydroxide, calcium hydroxide, and ammonia, wet etching using organic solvents such as aromatic solvents, ketone solvents, and alcohol solvents, dry etching using oxygen plasma, argon plasma, and $CF_4$ plasma, mechanical working using a pressing machine, and any other suitable etching techniques that are commonly employed. When at least one of the gate insulating film 36 and the interlayer insulation film 37 contains an organic material, the total thickness of the gate insulating film 36 and the interlayer insulation film 37 becomes about several millimeters. As the thickness of the films to be etched increases, the difficulty of making finer contact holes 35 increases. However, since one contact hole 35 is shared between a group of pixel electrodes 34, the requirement to make finer contact holes 35 is not as severe as in the related art in which one contact hole 35 is provided for every pixel electrode 34. Thus, the contact holes 35 can be formed easily even when at least one of the gate insulating film 36 and the interlayer insulation film 37 contains an organic material.

Figure 7G:
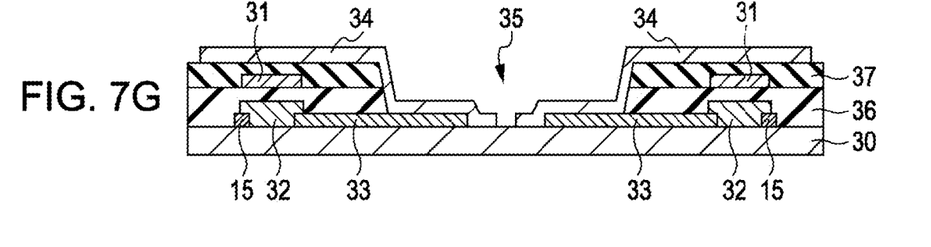

Pixel electrodes 34 are formed next as shown in FIG. 7G. The pixel electrodes 34 are mostly disposed at particular positions on the interlayer insulation film 37 and formed so that part of each pixel electrode 34 contacts the drain electrode 33 through the contact hole 35. Examples of the conductive material for the pixel electrodes 34 include Cr, Al, Ta, Mo, Nb, Cu, Ag, Au, Pt, Pd, In, Ni, and Nd and alloys of these metals; conductive oxides such as $InO_2$, $SnO_2$, and ITO; conductive polymers such as polyaniline, polypyrrole, polythiophene, and polyacetylene, to which dopants, e.g., acids such as hydrochloric acid, sulfuric acid, and sulfonic acid, Lewis acids such as $PF_6$, $AsF_5$, and $FeCl_3$, halogen atoms such as iodine, and metal atoms such as sodium and potassium may be added; and conductive compound materials in which carbon black and metal particles are dispersed. The technique for forming the gate electrodes 31 is the same as that for forming the signal lines 15. For example, any of a method combining a physical vapor deposition technique and photo etching, a vapor deposition treatment through a metal through mask, and a method for dropping a conductive particle-containing polymer mixture can be employed appropriately.

An electrophoretic sheet 40 is formed on the substrate 30 by a known method to end fabrication of an electrophoretic device (refer to FIG. 4).

Specific examples of electronic apparatuses that include the electrophoretic device described above will now be described.

Figure 8A:
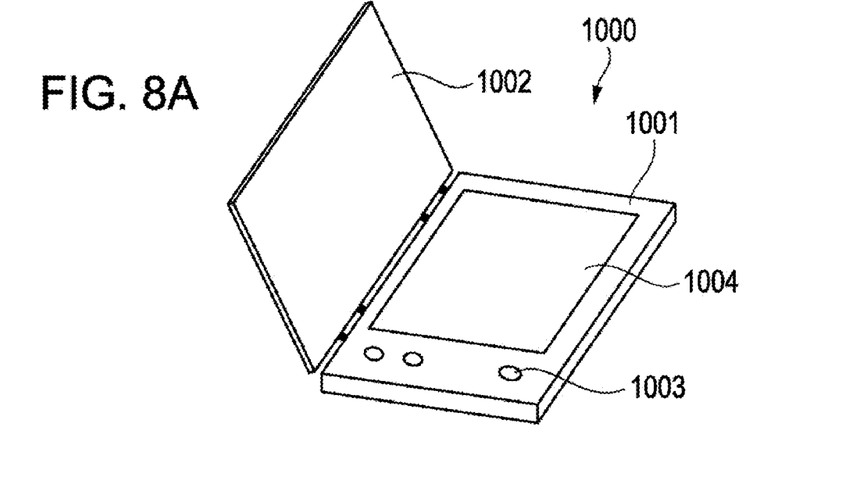
FIGS. 8A to 8C are perspective diagrams illustrating specific examples of electronic apparatuses.
Figure 8B:
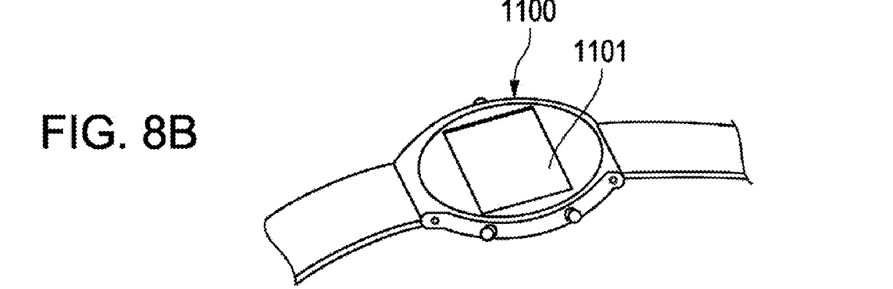
Figure 8C:
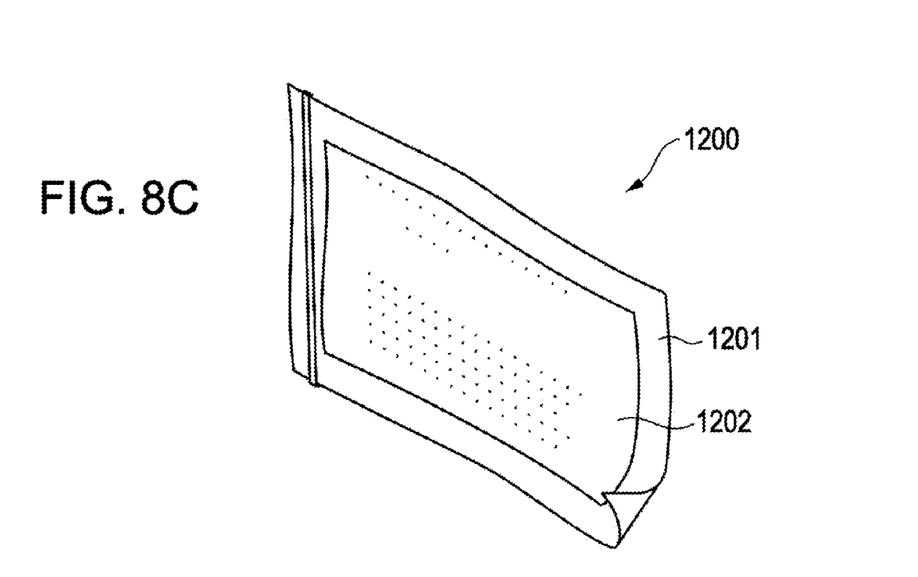

FIGS. 8A to 8C are perspective views illustrating specific examples of electronic apparatuses that use electrophoretic devices. FIG. 8A shows an electronic book, which is one example of the electronic apparatus. An electronic book 1000 includes a book-shaped frame 1001, a cover 1002 rotatably disposed in associated with the frame 1001, an operating unit 1003, and a display unit 1004 constituted by the electrophoretic device of this embodiment. FIG. 8B shows a wristwatch, which is another example of the electronic apparatus. A wristwatch 1100 includes a display unit 1101 constituted by the electrophoretic device of this embodiment. FIG. 8C shows an electronic paper, which is yet another example of the electronic apparatus. An electronic paper 1200 includes a main unit 1201 constituted by a rewritable sheet having the same texture and flexibility as paper, and a display unit 1202 constituted by the electrophoretic device of this embodiment. Note that the range of the electronic apparatuses to which the electrophoretic device can be applied is not limited to these and widely includes any apparatuses that use visual changes in color tones caused by movements of electrophoretic particles. For example, in addition to the apparatuses described above, unmovable objects such as wall surfaces to which electrophoretic films are bonded, and moving objects such as vehicles, airplanes, vessels, and the like are also included in the scope.

As described above, since one contact hole (opening) is shared between at least two adjacent electrodes and the electrodes are connected to the corresponding transistors through this shared contact hole, the requirement of alignment accuracy during production can be made less stringent compared to the cases where one contact hole is provided for every electrode. Therefore, the limitations regarding machines and processes used for manufacture are reduced, and a circuit board having a structure that can help improve yield can be provided.

It should be understood that the invention is not limited to the contents of the embodiments described above and various modifications and alterations are possible without departing from the scope of the invention.

For example, although a top-gate, button-contact-type organic transistors that use organic semiconductor films are described in the above embodiment as one example of transistors, other structures, such as a top-gate, top-contact structure, a bottom-gate, bottom-contact structure, and a bottom-gate, top-contact structure can be employed. The transistors are also not limited to organic transistors. Transistors that use inorganic films such as silicon films and the like may also be employed.

Furthermore, although a circuit board for use in an electrophoretic device is described in the embodiment above, the circuit board is not limited to this. The invention can be applied to a wide range of applications including circuit boards for use in various electro-optic apparatuses such as liquid crystal apparatuses, circuit boards for use in detecting apparatuses such as fingerprint sensors, pressure sensors, temperature sensors, and optical sensors, and circuit boards for use in memory devices.

The entire disclosure of Japanese Patent Application No. 2008-203130, filed Aug. 6, 2008 is expressly incorporated by reference herein.

What is claimed is:

1. A circuit board comprising:
    a substrate;
    a plurality of scan lines disposed on the substrate, the scan lines extending in a first direction;
    a plurality of signal lines disposed on the substrate, the signal lines extending in a second direction intersecting the first direction;
    a plurality of transistors, each of which is electrically connected to a corresponding one of the plurality of scan lines and corresponding one of the plurality of signal lines;
    an insulating layer that covers the plurality of scan lines, the plurality of signal lines, and the plurality of transistors; and
    a plurality of pixel electrodes, each of which is electrically connected to a corresponding one of the plurality of transistors,
    wherein:
        one opening is formed in the insulating layer for every electrode group, the electrode group being constituted by at least two adjacent pixel electrodes among the plurality of pixel electrodes, and
        each of the at least two pixel electrodes is electrically connected to the corresponding one of the transistors through the opening.

2. The circuit board according to claim 1, wherein the electrode group is constituted by two pixel electrodes arranged in the first direction, and
    the plurality of signal lines are arranged so that two signal lines are assigned for every electrode group and sandwich the opening.

3. The circuit board according to claim 2, wherein, the plurality of transistors are arranged so that two transistors are assigned for every electrode group and are arranged symmetrically to sandwich the opening.

4. The circuit board according to claim 1, wherein the electrode group is constituted by two pixel electrodes arranged in the second direction, and
    the plurality of scan lines are arranged so that two scan lines are assigned for every electrode group and sandwich the opening.

5. The circuit board according to claim 1, wherein the plurality of transistors are organic transistors.

6. The circuit board according to claim 1, wherein the electrode group is constituted by four pixel electrodes arranged in two rows in the first direction and two columns in the second direction,
- the plurality of scan lines are arranged so that two scan lines are assigned for every electrode group and sandwich the opening, and
- the plurality of signal lines are arranged so that two signal lines are assigned for every electrode group and sandwich the opening.

7. An electro-optic device comprising:
- the circuit board according to claim 1, and
- an electro-optic layer disposed on the circuit board.

8. The electro-optic device according to claim 7, wherein the electro-optic layer is an electrophoretic layer.

9. An electronic apparatus comprising:
- the electro-optic device according to claim 7.

* * * * *